US009504263B2

(12) United States Patent
Meggelaars et al.

(10) Patent No.: US 9,504,263 B2
(45) Date of Patent: Nov. 29, 2016

(54) DEVICE AND METHOD FOR TRANSFERRING LONGITUDINALLY SUPPLIED ELONGATE FOOD PRODUCTS

(75) Inventors: Sigebertus Johannes Jacobus Jozef Meggelaars, Eindhoven (NL); Marcus Bernhard Hubert Bontjer, Aarle Rixtel (NL); Mathias Marcellus Kuijpers, Wijchen (NL); Frank Johannes Antonius Van Den Heuij, Gennep (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 380 days.

(21) Appl. No.: 14/112,882

(22) PCT Filed: Mar. 27, 2012

(86) PCT No.: PCT/NL2012/050196
§ 371 (c)(1),
(2), (4) Date: Dec. 19, 2013

(87) PCT Pub. No.: WO2012/144890
PCT Pub. Date: Oct. 26, 2012

(65) Prior Publication Data
US 2014/0106654 A1    Apr. 17, 2014

(30) Foreign Application Priority Data
Apr. 20, 2011   (NL) .................................... 2006649

(51) Int. Cl.
*A22C 11/00*  (2006.01)
*A22C 15/00*  (2006.01)
*B65B 19/34*  (2006.01)
(Continued)

(52) U.S. Cl.
CPC ............. *A22C 15/001* (2013.01); *A22C 11/00* (2013.01); *A22C 11/008* (2013.01); *B65B 5/10* (2013.01); *B65B 19/34* (2013.01); *B65B 35/243* (2013.01); *B65B 35/26* (2013.01); *B65G 47/53* (2013.01); *B65G 47/846* (2013.01)

(58) Field of Classification Search
CPC ...... A22C 11/00; A22C 11/02; A22C 11/008
USPC ............. 198/441, 456, 457.07, 469.1, 478.1; 452/21–26, 30–32, 35–37, 46–48, 51
See application file for complete search history.

(56) References Cited

U.S. PATENT DOCUMENTS 3,363,741 A * 1/1968 Dierksheide ........... B65G 17/00
                                                        198/457.07
4,164,997 A * 8/1979 Mueller ................ B65G 47/71
                                                        198/427
(Continued)

FOREIGN PATENT DOCUMENTS

| EP | 0709317 A1 | 5/1996 |
| WO | 2010/130257 A1 | 11/2010 |
| WO | 2011/062754 A1 | 5/2011 |

*Primary Examiner* — Richard Price, Jr.
(74) *Attorney, Agent, or Firm* — Zarley Law Firm, P.L.C.

(57) ABSTRACT

The invention relates to a device (2) for transferring longitudinally supplied elongate food products (4), such as for instance sausages. The sausages are placed here in a recess (10) of a rotatable holder body (9) and subsequently set down in lateral direction. The invention further relates to an assembly (1) of such a transfer device and a feed conveyor (3) for sausages connecting to the transfer device. The invention moreover relates to a method for transferring elongate food products such as sausages.

20 Claims, 5 Drawing Sheets

(51) Int. Cl.
*B65G 47/84* (2006.01)
*B65B 35/24* (2006.01)
*B65B 35/26* (2006.01)
*B65G 47/53* (2006.01)
*B65B 5/10* (2006.01)

(56) References Cited

U.S. PATENT DOCUMENTS

| | | | | |
|---|---|---|---|---|
| 4,542,818 A | * | 9/1985 | Pavie | B07C 1/025 198/408 |
| 4,858,770 A | * | 8/1989 | Gamberini | B65B 19/28 198/457.01 |
| 5,096,042 A | * | 3/1992 | Loll | B07C 5/362 198/441 |
| 5,590,753 A | * | 1/1997 | Bertschi | B65G 47/847 198/441 |
| 6,669,004 B1 | * | 12/2003 | Schoop | B65G 29/02 198/441 |
| 7,036,655 B2 | * | 5/2006 | Schafer | B65G 47/08 198/459.2 |
| 7,044,847 B2 | * | 5/2006 | Ketels | A22C 25/00 452/162 |
| 7,219,790 B2 | * | 5/2007 | Lanfranchi | B65G 47/848 198/471.1 |
| 7,220,932 B2 | * | 5/2007 | Monti | B65G 47/848 198/370.1 |
| 7,997,401 B2 | * | 8/2011 | Fischer | B65G 29/00 198/411 |
| 8,092,283 B2 | * | 1/2012 | Hansen | A22C 25/08 452/121 |

* cited by examiner

DEVICE AND METHOD FOR TRANSFERRING LONGITUDINALLY SUPPLIED ELONGATE FOOD PRODUCTS

BACKGROUND OF THE INVENTION

The present invention relates to a device for transferring elongate food products, such as for instance sausages. The invention also relates to a method for transferring elongate food products, such as for instance sausages.

During the manufacture and the first subsequent processing steps elongate food products, such as for instance sausages, are generally further displaced from a product location in a relative orientation placed successively in a row one behind another. That is, the elongate food products are usually supplied in a longitudinal direction. Later processing steps may require a displacement in a direction perpendicularly of the longitudinal, this direction being referred to here as a transverse direction. There may be different reasons for a displacement in lateral direction; the sausages can for instance be transported (more compactly) in a lateral direction in closer arrangement, the transport speed in lateral direction can be reduced, determined operations—such as for instance packaging—can be carried out in more controlled manner, and so on. A change in the transport direction of the elongate food products requires (perpendicular) transfer of the products. Particularly characteristic of elongate food products is moreover that they are generally vulnerable and may therefore be mechanically loaded to only limited extent. Yet another condition for the transfer of food products is that it must take place in hygienic manner.

The object of the present invention is to provide a reliable transfer device with which elongate food products can be transferred at high speed without the food products being damaged.

SUMMARY OF THE INVENTION

The invention provides for this purpose a device for transferring longitudinally supplied elongate food products, such as for instance sausages, comprising: a holder body rotatable around a longitudinal rotation axis and provided with a peripheral surface and two end surfaces connecting on opposite sides to the peripheral surface, wherein the rotation axis passes through the centre of the two end surfaces, and wherein a plurality of elongate receiving spaces for elongate food products are recessed into the peripheral surface, wherein the receiving spaces are located such that the longitudinal direction of the receiving spaces correspondents to projections of the rotation axis onto the peripheral surface, and which receiving spaces are also opened to at least one of the end surfaces for longitudinal feed of the elongate food products to the receiving spaces, and drive means for rotating the holder body. The peripheral surface can be seen here as a jacket in which the receiving spaces are arranged. Using such a transfer device each of the longitudinally supplied elongate food products can be carried into a receiving space, after which or during the feed the holder body is advanced; a new (free) receiving space thus becomes available again into which a following elongate food product can be introduced. The advance (rotation) of the holder body can also be employed in order to thus ensure that during (a part of) the infeed path into the receiving space a transverse force is exerted on the elongate food product. It thus becomes possible to better regulate the infeed depth of the elongate food product. The infeed depth is important when the elongate food products are set down from the holder body; this is because it is desirable to deliver the set down food products in the best possible alignment. There are many variables which can affect the infeed depth of the elongate food products in the receiving spaces; these include the humidity; the stiffness, the degree of curvature, the variation in length, the variation in weight and the variation in the diameter of the products. Compensation for this variation can be provided by controlling the rotation speed. This rotation speed can be a uniform rotation speed, although it is more obvious to rotate the holder body in discontinuous manner with successive step/rest movements. After a pause (in which the elongate products are carried at least partially into the holder body) there then follows a (rapid) rotation over some distance, during which rotation the resistance to the elongate food product to be supplied is influenced. It is of course also possible to carry the products into the receiving spaces such that they are stopped by an (end) stop. The drawback hereof is however that, when an outer end of the relatively vulnerable elongate food products comes up against a stop, (undesirable) deformation of the products can occur. Controlling the rotation speed of the holder body now influences the resistance to which the elongate food products are subjected when they enter the receiving spaces. The longitudinal displacement of the elongate food products in the receiving spaces can thus be influenced.

Reference is also made in the context of the present invention to the international patent application WO 2011/048059 which describes the displacement and reorientation of elongate food products such as sausages, wherein use can be made of an indexed conveyor belt. The present invention forms an alternative to such a construction, but can also be applied in combination with the invention described in this publication.

In a specific embodiment variant the receiving spaces extend substantially parallel to the rotation axis. The wording of the receiving spaces extending "substantially" parallel to the rotation axis should be interpreted such that, when the peripheral surface of the holder body has a non-narrowing form, the receiving spaces can lie wholly parallel to the rotation axis. In the case of a holder body narrowing or widening in longitudinal direction the longitudinal direction of the receiving spaces will enclose an angle with the rotation axis. In the case of sharply narrowing or widening holder bodies this angle can thus lie between 0 and 45°. An example of such a narrowing or widening holder body is a conical roll. The designation "substantially parallel" is thus understood to refer to enclosing angles of less than 30°, preferably less than 15°.

In another specific embodiment the device also comprises a product guide partially surrounding the peripheral surface of the rotatable holder body, which product guide is provided at least at a position located on the underside of the holder body with a passage opening with a passage area at least equal to the projection onto the product guide of an elongate food product perpendicularly of the longitudinal axis of the elongate food product. It is otherwise noted that the passage opening need not be located on the lowest part of the holder body; the underside is here understood to mean the lower half of the holder body. The term upper side should also be interpreted in the same way; this is understood to mean the upper half of the holder body. The product guide prevents a product present in a receiving space moving laterally out of the receiving space as a result of for instance the gravitational force or the intermittent step/rest movement of the holder body. Only when a receiving space filled with an elongate food product has reached an ejection position (i.e. the position where the passage opening is situated in the guide), can the elongate food product leave the holder body since the guide is not present (locally) at that position. Since this passage opening is located on the underside of the holder body, the gravitational force exerted on the elongate food product (optionally supplemented by an additional ejection force) will contribute toward removal of the elongate food product from the holder body.

The rotatable holder body can have a three-dimensional main form chosen from the group of geometrical forms of: cylinder, straight prism, truncated cone, truncated pyramid, prismoid, obelisk and/or other rotation-symmetrical body. The receiving spaces are recessed into the peripheral jacket of the holder body and, in order to enable the infeed as well as outfeed of the elongate food products respectively into and out of the holder body at fixed positions, it must be possible during rotation of the holder body to always load/empty the successive receiving spaces at the same location. In order to make this possible the receiving spaces in a specific variant will be located rotation-symmetrically relative to the rotation axis of the holder body. Many embodiment variants of the holder body are possible; the holder body can be provided for instance with a cylindrical jacket or be assembled from a plurality of jacket surfaces. The forms of the end surfaces of the holder body will therefore vary here; they can for instance be circular or have the form of a regular polygon. It is further noted that the holder body can have a hollow construction, for instance in order to save weight. Yet another option is that the holder body can have a cut-away construction (assembled for instance from wire material or material strips) in which the receiving spaces are arranged. These receiving spaces can also be constructed here from a material (plastic, metal sheet) other than the material from which the holder body, but not the receiving spaces, is manufactured.

In order to bring about a uniform progress of the step/rest movement of the holder body, the usual option will be to recess the receiving bodies at mutually identical distances in the peripheral surface.

In order to enable a feed of elongate food products wherein the food products support particularly against the (longitudinal) walls of receiving spaces, it is favourable that in at least one position located on the upper side of the holder body the receiving spaces are accessible on an end surface for the longitudinal feed of elongate food products to the receiving spaces.

In another embodiment variant the receiving spaces in the holder body are provided with a displaceable side wall on the side opposite the side opened to an end surface of the holder body. This displaceable side wall can thus be used for accurate positioning in longitudinal direction of the food products introduced into the receiving spaces. During the infeed of a food product the displaceable side wall can be held in a retracted position (i.e. a position at a relatively great distance from the opened end surface of the associated receiving space). It is thus possible to prevent the elongate food product coming into contact with the displaceable side wall with great speed/force such that undesirable deformation of the food product occurs at the position of the contact between the food product and the displaceable side wall. It is possible here to place the displaceable side wall so far to the rear that there will be no contact at all between the displaceable side wall and the elongate food product at the moment of introduction, although it is also possible to position the displaceable side wall such that only elongate food products which penetrate far (further than other introduced elongate food products) make contact with limited speed/force and therefore do not deform.

When the displaceable side walls of the individual receiving spaces are embodied such that they are individually displaceable to a position dependent on the rotation position in which the holder body is located, it becomes possible, once the elongate food products have been introduced, to push them back (to greater or lesser extent or not all depending on their position) in order to place them in a precisely determined longitudinal position. Along the path which the elongate food products cover in the receiving space of the holder body, from the infeed location on the upper side of the holder body to the outfeed position on the underside of the holder body, they can be engaged by the displaceable side wall so as to be urged to a longitudinal end position. For a simple control thereof, the displaceable side walls can for instance be individually connected to a stationary side wall guide. "Stationary" is understood here to mean that the guide does not co-rotate with the holder body. Each displaceable wall part can thus be provided with cam followers which co-act with a non-co-rotating cam disc or a stationary guide channel for the cam followers. In another variant the displaceable side walls can be provided on the side facing toward the receiving space with a concave contact surface; this is particularly favourable when the curvature on the contact surface matches the curvature of the food products at the position where they are engaged. Displaceable side walls of other form can however also be applied; in a simple variant these take for instance a flat form.

The transfer device can also be provided with one or more spray nozzles for supplying a medium at a specific position to the receiving spaces. Blow air can for instance thus be used for simplified release of the elongate food products and/or for blowing clean the receiving spaces. Another option is for instance to introduce water (mist) for the purpose of thus standardizing the conditions for introducing elongate food products into the receiving spaces. Yet another option is to position the elongate food products in the receiving spaces using a medium.

It is also possible to provide the transfer device with at least one sausage-processing tool for performing a processing at a specific position on sausages lying in the receiving spaces. It is for instance possible here to envisage surface-influencing processes such as—optionally locally—arranging a coating or marking on the sausages and/or irradiation of the sausages. Another possible option is to provide the surface with perforations or other deformations, although there are numerous other conceivable processes which can be carried out on the sausages located in the receiving spaces.

In yet another variant the transfer device is provided with a bearing for rotatable positioning of the holder body such that the rotation axis is oriented substantially horizontally. The introduction and the release of the elongate food products is thus facilitated. Other orientations of the rotation axis may however be desirable in determined situations. The holder body can thus also be disposed such that the position of the receiving space into which an elongate food product is introduced inclines downward to greater or lesser extent as seen from the entrance thereof.

The control of the transfer device can be optimized with an intelligent control and, if the transfer device is then also further provided with a sensor connecting to the control, the detected situational conditions can be employed for the purpose of optimizing the control. It is for instance possible here to envisage the moments at which elongate food products are fed, the feed speed, variations in respect of the geometry or other physical characteristics of individual products, the infeed depth into the receiving spaces and so forth. A simple and effective driving of the holder body can be realized using a stepping motor.

The invention also provides an assembly of a transfer device as described above and feed means for the elongate food products connecting to the transfer device, which feed means comprise an endless conveyor supporting the elongate food products, the conveyor being positioned relative to the transfer device such that an elongate food product supplied with the feed means can be carried into the opened end surface of a receiving space. The elongate food product is presented here in longitudinal direction to the transfer device by the feed means. In order to control the positioning of the supplied elongate food products in lateral direction, the feed means for the elongate food products can be provided with two product guides standing relative to the endless conveyor. The elongate food products to be supplied will be urged by the standing product guides to a location between the two standing product guides. It will be apparent that the elongate food products can in this way be aligned in lateral direction relative to the receiving spaces into which the elongate food products have to be carried.

When the mutual distance between the two standing product guides close to the supporting endless conveyor is greater than the mutual distance between the two standing product guides further away from the supporting endless conveyor, the standing product guides can be utilized not only to align the elongate food products in lateral direction; they can also urge the elongate food products with some force against the supporting endless conveyor. This means that the position of the elongate food products can be controlled even better when they are presented to the receiving spaces. Curved elongate food products can moreover be engaged such that they are less curved when they leave the feed means. In order to limit the resistance between the standing product guides and the elongate food products it is possible to embody the standing product guides as endless conveyors.

The present invention also relates to a method for transferring elongate food products, such as for instance sausages, comprising the processing steps of: A) feeding an elongate food product in a feed position in axial direction via an end surface to a receiving space in the holder body of a transfer device as described above, wherein the feed position of the receiving space lies on the upper side of the holder body, B) rotating the holder body wherein at least one elongate food product located in a receiving space is displaced from the feed position to a lower-lying ejection position, and C) removing the elongate food product in the ejection position in radial direction from a receiving space in the holder body, wherein the outfeed position of the receiving space lies on the underside of the holder body. For the advantages of this method reference is made to the advantages already described above of the transfer device according to the present invention. Of great importance is the possibility of transferring elongate food products supplied at high speed to a displacement in a direction perpendicularly of the longitudinal (which can also be referred to as a transverse displacement) wherein the products can simultaneously be aligned in the direction perpendicularly of the longitudinal without exerting considerable forces on outer ends of products. The direction of displacement is thus not only converted from longitudinal to transverse; the products can also be laid in a straight row by the method without being deformed. This simplifies subsequent processes, such as for instance packaging of the products. Placing the transversely displacing transferred products in a straight line can be realized in forced manner when the elongate food products are engaged while passing through processing step B) by a pusher element for placing the elongate food products in a specific longitudinal position in the receiving spaces. The friction resistance to which an elongate food product is subjected by at least one of the walls of the receiving space can however also already be influenced by rotating the holder body during at least a part of the introduction of an elongate food product in longitudinal direction into a receiving space, and the transversely displacing transferred products can also be aligned in this way. During the feed of an elongate food product to a receiving space it is desirable for the holder body, and so also the receiving space into which the product has to be introduced, to halt temporarily. This can be realized when the holder body is rotated intermittently. This is understood to mean that the holder body makes step/rest movements.

Another option is that, as the holder body passes through a complete rotation, a medium is introduced at a determined position into a receiving space. As already described above, this medium can be a gas or liquid (water and air have already been mentioned as examples) in order to thus clean the receiving spaces, support loading or release or for other purposes. Yet another option for enhancing the accuracy of transfer is for an elongate food product to be urged into a longitudinal orientation by the feed means before being introduced into the holder body as according to processing step A).

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
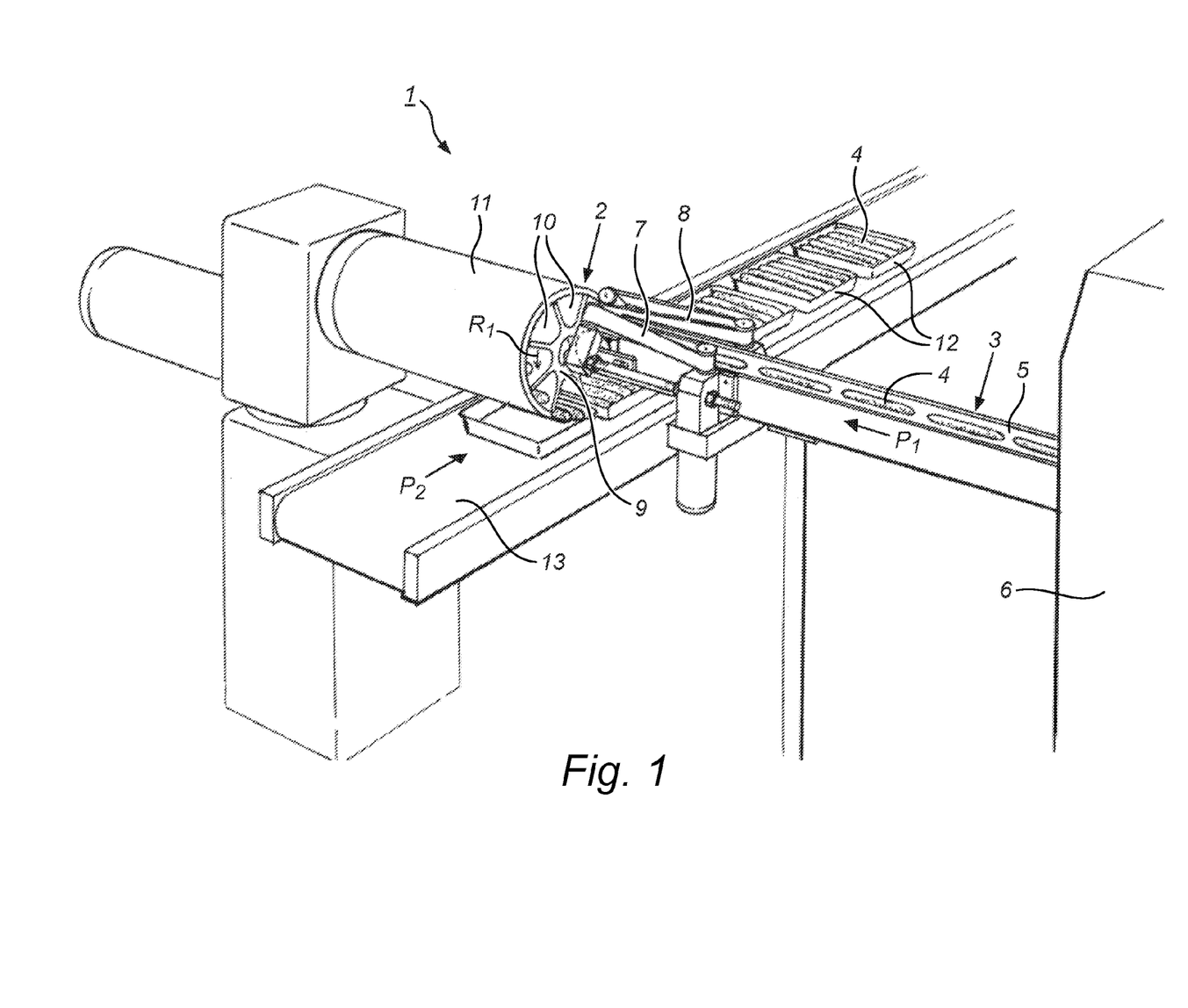
FIG. 1 is a perspective view of an assembly of a transfer device and a feed according to the present invention.

FIG. 1 is a perspective view of an assembly 1 of a transfer device 2 and a feed 3 for transporting sausages 4. Sausages 4 are supplied in longitudinal orientation (lying one behind another in lengthwise direction) as according to arrow $P_1$ by a conveyor belt 5 supporting the sausages 4, and can for instance be coming from a sausage producing machine 6, here shown schematically. The sausages 4 supplied on conveyor belt 5 are centred on the supporting conveyor belt 5 by two standing sausage guides 7,8 co-acting with conveyor belt 5; the operation hereof will be further elucidated with reference to FIG. 4. Feed 3 connects to transfer device 2, a holder body 9 of which is provided with a number of receiving spaces 10 for sausages 4 recessed into the jacket. Holder body 9 is rotatable, usually intermittently, in a rotation direction $R_1$. A sausage guide 11 is arranged around a part of holder body 9. The operation of holder body 9 and sausage guide 11 will be further discussed with reference to FIGS. 2, 3A and 3B. After being transferred by transfer device 2 the sausages 4 are set down in sausage trays 12 which are discharged as according to arrow $P_2$ with a conveyor belt 13 in a lateral direction relative to feed direction $P_1$. The relative orientation of sausages 4 is changed here and, as also shown in this figure, it is important that transfer device 4 sets down sausages 4 such that they are in a line; this makes it possible to place sausages 4 directly into sausage trays 12.

Figure 2:
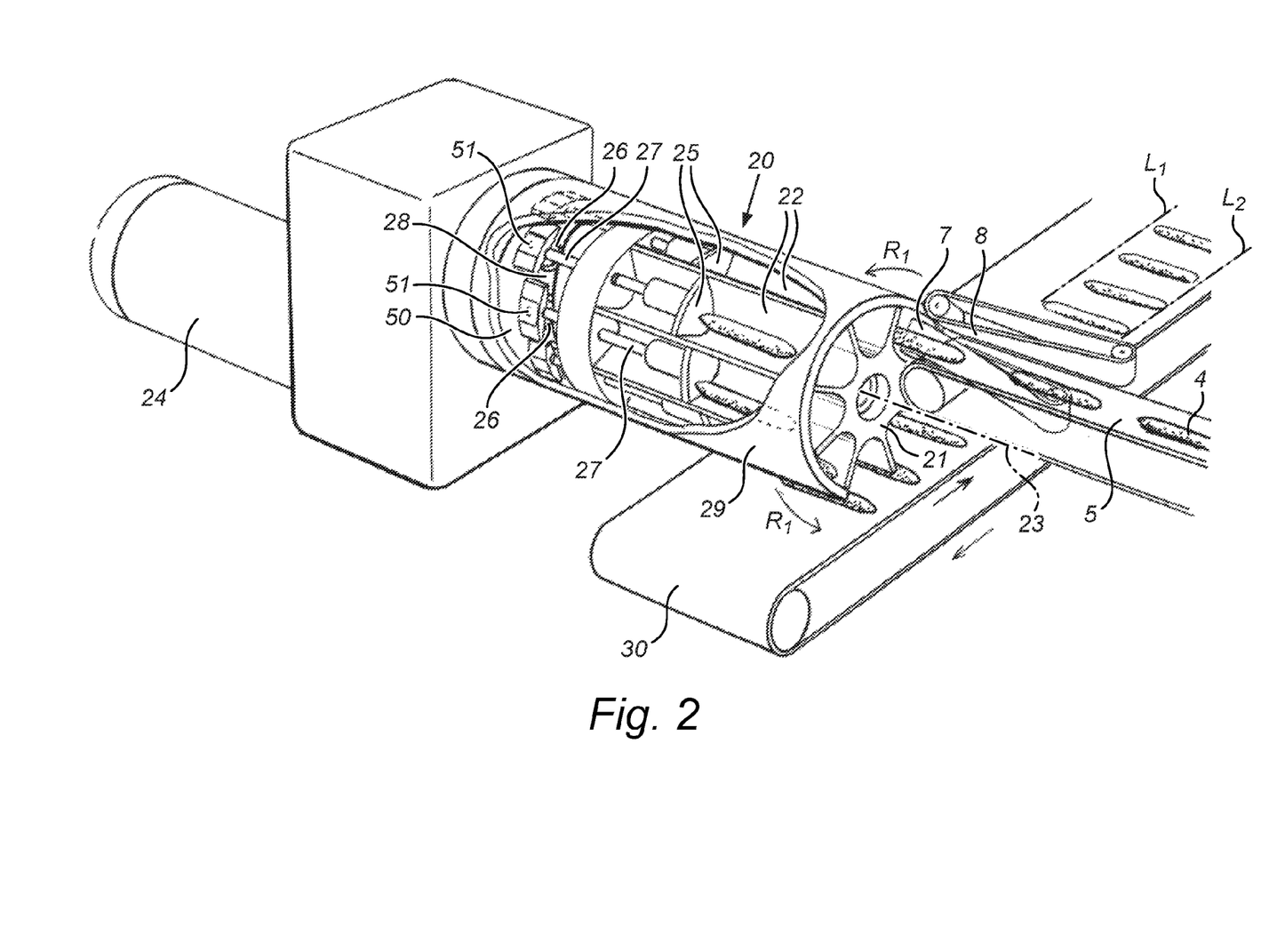
FIG. 2 is a cut-away perspective view of an alternative embodiment variant of an assembly of a transfer device and a feed according to the present invention.

FIG. 2 shows in more detail a cut-away view of a transfer device 20 with a rotatable holder body 21, in the jacket of which are recessed receiving spaces 22. Holder body 21 is rotatable around a rotation axis 23 and is driven for this purpose by a motor 24, for instance a stepping motor. The sausages 4 supplied by the conveyor belt 5 provided with two standing sausage guides 7,8 are carried into a receiving space 22 in a position as illustrated (top right). The rotatable holder body 21 will desirably stop briefly for this purpose (the rotation $R_1$ is temporarily halted for this purpose). Once a sausage 4 has been placed in a receiving space 22, with the further movement of holder body 21 (i.e. the stepwise rotation of holder body 21 as according to arrow $R_1$) a displaceable side wall 25 will move toward the feed side of the receiving space. The displaceable side walls 25 engage for this purpose with cam rollers 26 (which are connected to the displaceable side walls 25 via rods 27) in a channel 28 arranged in a stationary part 50 (not co-rotating with holder body 21) of transfer device 20. In order to align and hold cam rollers 26 positioned in channel 28, they are coupled here to support blocks 5I. As holder body 21 rotates, a displaceable side wall 25 will thus urge a sausage 4 back to limited extent in the direction of the feed opening of receiving space 22 in which the relevant sausage 4 is located. Sausage 4 remains here in receiving space 22 until receiving space 22 has rotated so far that it is no longer covered by a sausage guide 29 partially surrounding holder body 21. Under the influence of gravitational force the sausage 4 will now drop laterally out of receiving space 22 onto a discharge conveyor 30 and then be further displaced in a lateral orientation. The displaceable side walls 25 here cause the sausages 4 to drop onto conveyor 30 such that they lie in a line. This simplifies the further processing of sausages 4. This alignment of the laterally discharged sausages 4 onto conveyor belt 30 is indicated in the figure by means of a pair of imaginary lines $L_1$, $L_2$.

Figure 3A:
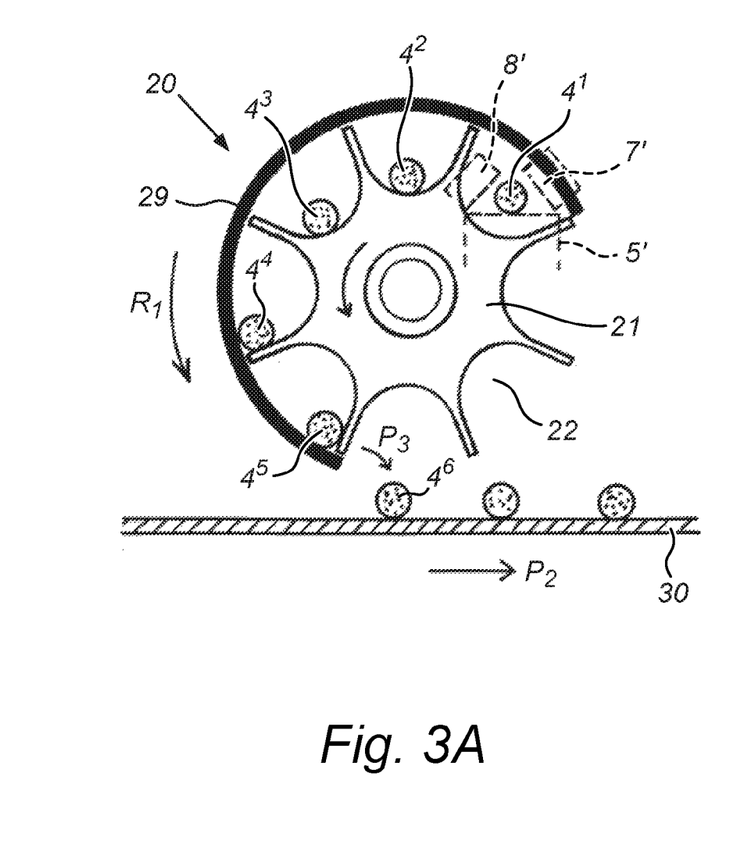
FIGS. 3A and 3B show cross-sections through two variants of a transfer device according to the present invention.

FIG. 3A shows a cross-section of transfer device 20 of FIG. 2. Holder body 21 is loaded with a sausage $4^1$ at a position located at top right by means of a conveyor belt 5' with sausage guides 7', 8' indicated with broken lines. Sausage $4^1$ will then pass through multiple positions in rotation direction $R_1$, as this rotation of holder body 21 has already been described on the basis of the rotation of holder body 9 described with reference to FIGS. 1 and 2. Sausages $4^2$, $4^3$, $4^4$, $4^5$ are also shown in different successive positions. Sausages $4^2$, $4^3$, $4^4$, $4^5$ cannot leave the receiving space 22 laterally because receiving spaces 22 are closed at that position in lateral direction by a sausage guide 29. When the holder body is advanced one position further, receiving space 22 is no longer covered laterally, which makes it possible for a sausage $4^6$ to drop out of receiving space 22 (arrow $P_3$) and be further discharged by conveyor belt 30 in direction $P_2$. Conveyor belt 30 can be controlled here such that sausages 4 are grouped.

Figure 3B:
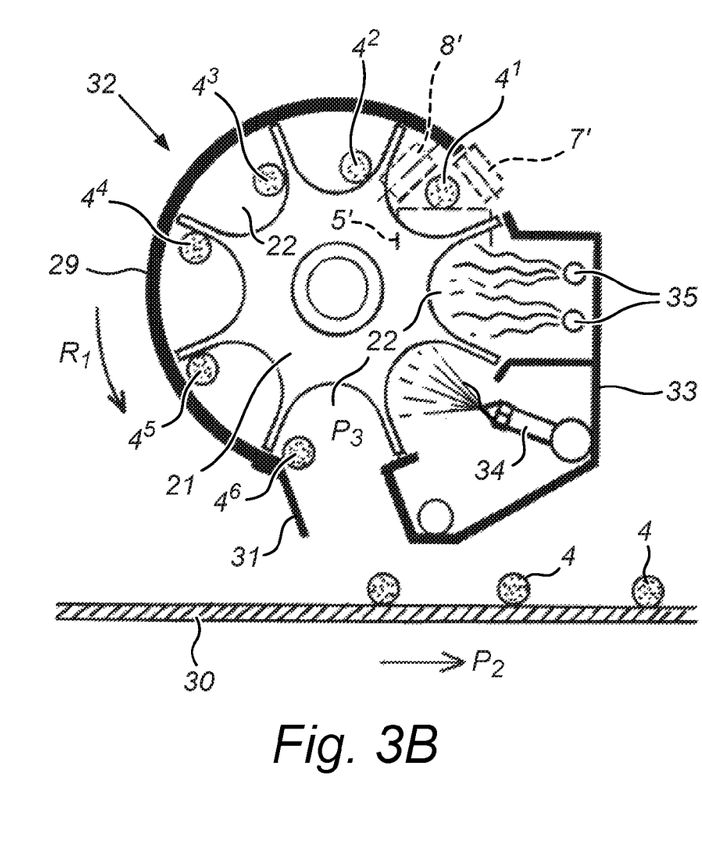

FIG. 3B shows an alternative embodiment variant of the cross-section as drawn in FIG. 3A. Only the differing components are discussed with reference to this figure. Where components correspond the same reference numerals are also used. Sausage guide 29 is provided in this figure with an outfeed plate 31 for the purpose of depositing the laterally exiting sausage $4^6$ with even more control onto conveyor belt 30. Another difference is that transfer device 32 as shown here schematically is provided with an additional housing 33 in which receiving spaces 22, in a position not filled with sausage, can be cleaned with blow air using a blow nozzle 34. In a subsequent position, likewise not filled with sausage 4, a liquid medium can be applied with nozzles 35 so as to thus influence the frictional resistance of receiving spaces 22 relative to sausages 4. Another option is to perform a processing on sausages 4, in a position that is filled with sausage 4, in one or more receiving spaces 22. Examples of such processing of sausages 4 are for instance performing a laser process, arranging perforations, printing and/or placing of a sticker, although other processes not mentioned here are also possible.

Figure 4:
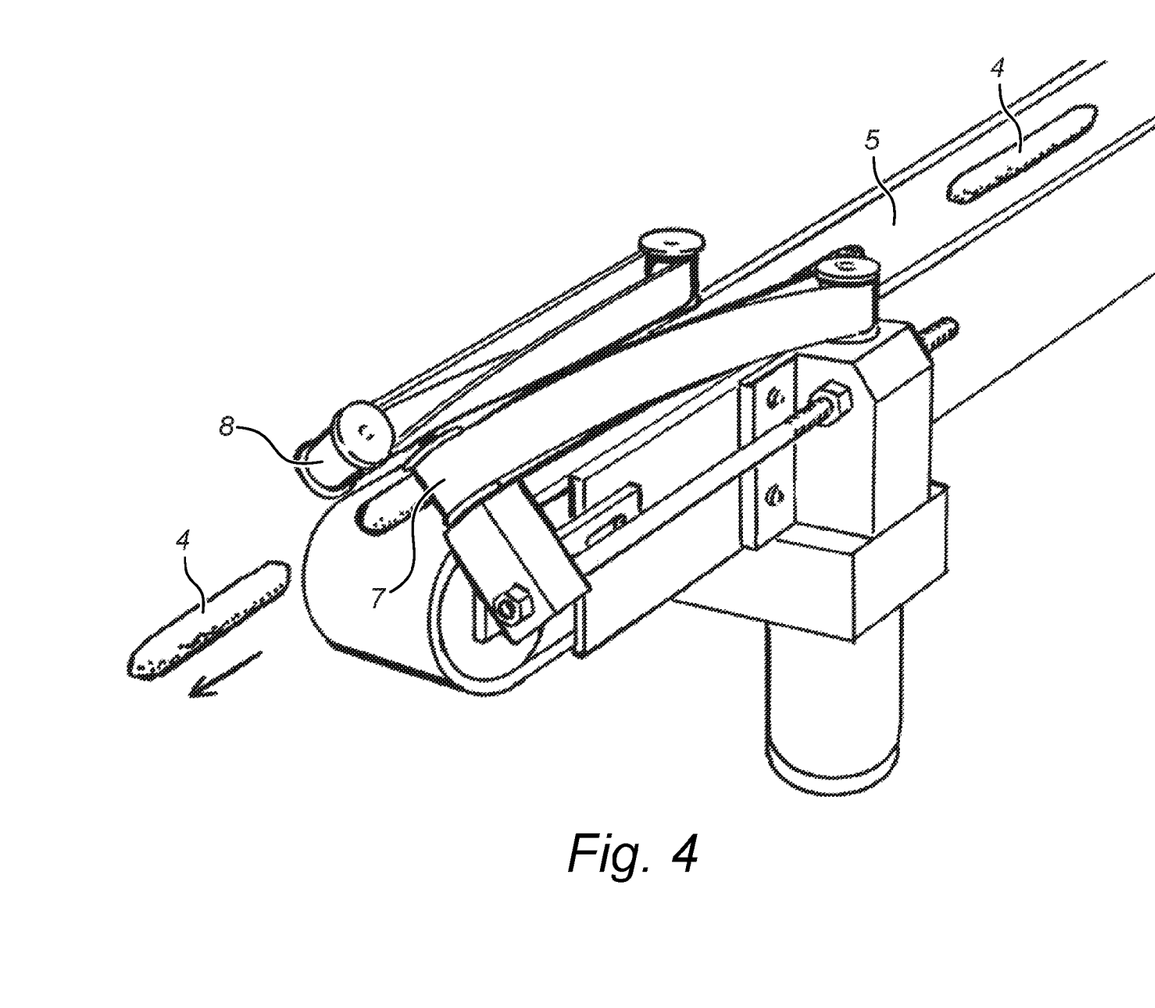
FIG. 4 is a perspective view of a feed for elongate food products.

FIG. 4 shows the belt 5 feeding sausages 4 of FIGS. 1 and 2 in more detail. The two standing sausage guides 7,8 co-acting with conveyor belt 5 are formed by endless conveyor belts, the contact surfaces of which co-displace with the sausages 4. The danger of damage to sausages 4 as a result of contact with sausage guides 7,8 is thus limited. Also shown clearly in this figure is that at the position where the sausage guides end the mutual distance between the sausage guides 7,8 further away from conveyor belt 5 is smaller than closer to conveyor belt 5. Parts of sausages 4 possibly lying some distance from conveyor belt 5, which can for instance be the case when sausages 4 are curved, are hereby forced downward once again, with the result that the sausages 4 fed by conveyor belt 5 can be processed more easily since they display less variation in shape and position than if the inclining sausage guides 7,8 were absent. Moreover shown is that sausage guides 7,8 are rotated such that they reach the "shaping" end position more gradually; the sausages 4 carried by conveyor belt 5, should they have a shape varying from straight, will thus be restored more gradually to a straighter shape.

Figures 5A, 5B:
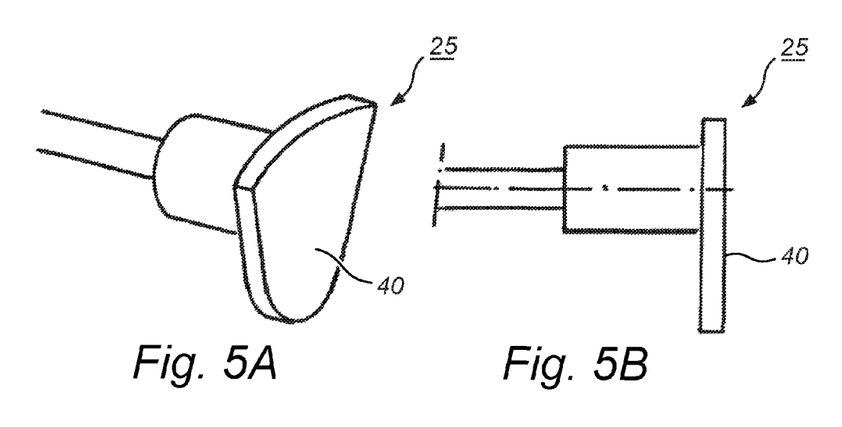
FIGS. 5A and 5B show two different views of a first embodiment variant of a displaceable side wall of a receiving space.
Figures 5C, 5D:
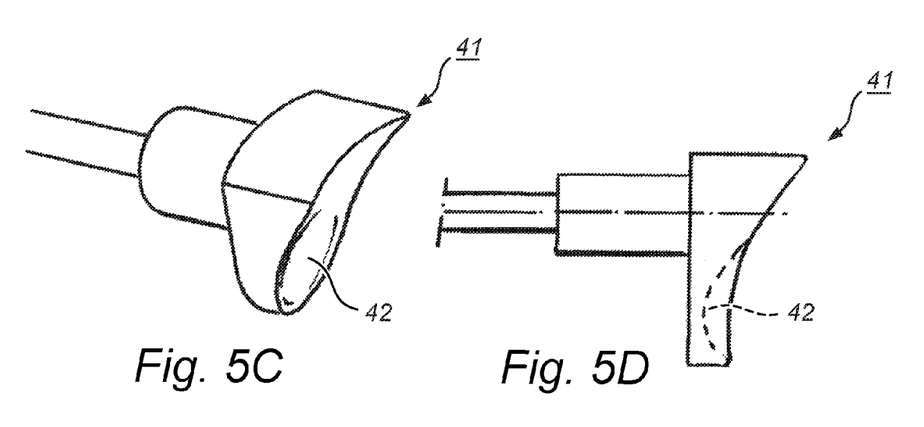
FIGS. 5C and 5D show two different views of a second embodiment variant of a displaceable side wall of a receiving space.

FIGS. 5A and 5B show two views of a displaceable wall part 25 as shown in FIG. 2, but now separately. A contact surface 40 of the displaceable wall part 25 here takes a flat form and can be applied to urge a sausage 4 lying in a receiving space 22 (see FIG. 2) to a determined axial set-down position. FIGS. 5C and 5D show two views of a displaceable wall part 41 which has a contact surface 42 which takes a concave form. The advantage of a concave contact surface 42 is that this will generally better match the shape of the outer end of a sausage 4, so that when it engages a sausage 4 and exerts a force there is a reduced chance of the sausage outer end being deformed. It is thus possible to embody a wall part 25,41 such that the shape thereof is adapted to the shape of the elongate food products to be engaged.

What is claimed is:

1. Device for transferring longitudinally supplied elongate food products, such as for instance sausages, comprising:
   a holder body rotatable around a longitudinal rotation axis and provided with a peripheral surface and two end surfaces connecting on opposite sides to the peripheral surface, wherein the rotation axis passes through the centre of the two end surfaces, and wherein a plurality of elongate receiving spaces for elongate food products are recessed into the peripheral surface, wherein the receiving spaces are located such that the longitudinal direction of the receiving spaces correspondents to projections of the rotation axis onto the peripheral surface, and which receiving spaces are also opened to at least one of the end surfaces for longitudinal feed of the elongate food products to the receiving spaces, and drive means for rotating the holder body.

2. Transfer device as claimed in claim 1, characterized in that the receiving spaces extend substantially parallel to the rotation axis.

3. Transfer device as claimed in claim 1, characterized in that the device also comprises a product guide partially surrounding the peripheral surface of the rotatable holder body, which product guide is provided at least at a position located on the underside of the holder body with a passage opening with a passage area at least equal to the projection onto the product guide of an elongate food product perpendicularly of the longitudinal axis of the elongate food product.

4. Transfer device as claimed in claim 1, characterized in that the rotatable holder body has a three-dimensional main form from the group of: cylinder, straight prism, truncated cone, truncated pyramid, prismoid, obelisk and/or other rotation-symmetrical body.

5. Transfer device as claimed in claim 1, characterized in that the receiving spaces are recessed at mutually identical distances in the peripheral surface.

6. Transfer device as claimed in claim 1 characterized in that in at least one position located on the upper side of the holder body the receiving spaces are accessible on an end surface for the longitudinal feed of elongate food products to the receiving spaces.

7. Transfer device as claimed in claim 1, characterized in that the transfer device is provided with at least one spray nozzle for supplying a medium at a specific position to the receiving spaces.

8. Transfer device as claimed in claim 1, characterized in that the transfer device is provided with at least one sausage-processing tool for performing a processing at a specific position on sausages lying in the receiving spaces.

9. Transfer device as claimed in claim 1, characterized in that the transfer device is provided with a bearing for rotatable positioning of the holder body such that the rotation axis is oriented substantially horizontally.

10. Transfer device as claimed in claim 1, characterized in that the transfer device is provided with an intelligent control controlling the drive means.

11. Transfer device as claimed in claim 10, characterized in that the transfer device is provided with a sensor connecting to the control.

12. Transfer device as claimed in claim 1, characterized in that the drive means comprise a stepping motor.

13. Assembly of a transfer device as claimed in claim 1, and feed means for the elongate food products connecting to the transfer device, which feed means comprise an endless conveyor supporting the elongate food products, the conveyor being positioned relative to the transfer device such that an elongate food product supplied with the feed means can be carried into the opened end surface of a receiving space.

14. Assembly as claimed in claim 13, characterized in that the feed means for the elongate food products are provided with two product guides standing relative to the endless conveyor.

15. Assembly as claimed in claim 14, characterized in that the mutual distance between the two standing product guides close to the supporting endless conveyor is greater than the mutual distance between the two standing product guides further away from the supporting endless conveyor.

16. Assembly as claimed in claim 14, characterized in that the standing product guides are endless conveyors.

17. Device for transferring longitudinally supplied elongate food products, such as for instance sausages, comprising:

a holder body rotatable around a longitudinal rotation axis and provided with a peripheral surface and two end surfaces connecting on opposite sides to the peripheral surface, wherein the rotation axis passes through the centre of the two end surfaces, and wherein a plurality of elongate receiving spaces for elongate food products are recessed into the peripheral surface, wherein the receiving spaces are located such that the longitudinal direction of the receiving spaces correspondents to projections of the rotation axis onto the peripheral surface, wherein the receiving spaces in the holder body are provided with a displaceable side wall on the side opposite the side opened to an end surface of the holder body, and which receiving spaces are also opened to at least one of the end surfaces for longitudinal feed of the elongate food products to the receiving spaces, and drive means for rotating the holder body.

18. Transfer device as claimed in claim 17, characterized in that the displaceable side walls of the individual receiving spaces are individually displaceable to a position dependent on the rotation position in which the holder body is located.

19. Transfer device as claimed in claim 17, characterized in that the displaceable side walls are individually connected to a stationary side wall guide.

20. Transfer device as claimed in claim 17, characterized in that the displaceable side walls are provided on the side facing toward the receiving space with a concave contact surface.

* * * * *